United States Patent [19]
Sturman et al.

[11] Patent Number: 5,711,347
[45] Date of Patent: Jan. 27, 1998

[54] DOUBLE SOLENOID LATCHING BALL VALVE WITH A HOLLOW BALL

[76] Inventors: Oded E. Sturman, 3973 Santa Monica Ct., Newbury Park, Calif. 91320; Steven Massey, 1106 Via Montoya, Camarillo, Calif. 93010

[21] Appl. No.: 703,522

[22] Filed: Aug. 27, 1996

[51] Int. Cl.⁶ .................................................. F15B 13/044
[52] U.S. Cl. ............................ 137/625.65; 251/129.1; 251/129.14
[58] Field of Search ................ 137/625.65; 251/129.14, 251/129.1

[56] References Cited

U.S. PATENT DOCUMENTS

| | | | |
|---|---|---|---|
| 2,366,412 | 1/1945 | Lambert | 251/129.14 X |
| 3,443,585 | 5/1969 | Reinicke | 251/129.14 X |
| 4,556,085 | 12/1985 | Warrick | 137/625.65 |
| 4,819,693 | 4/1989 | Rodder | 251/129.14 X |
| 5,460,329 | 10/1995 | Sturman | 251/129.1 X |

FOREIGN PATENT DOCUMENTS

| | | | |
|---|---|---|---|
| 323738 | 8/1920 | Germany | 251/129.14 |
| 2221929 | 8/1973 | Germany | 251/129.14 |

*Primary Examiner*—Gerald A. Michalsky
*Attorney, Agent, or Firm*—Blakely Sokoloff Taylor & Zafman

[57] ABSTRACT

A fluid flow control valve which has a pair of solenoids that move a hollow ball valve between a first position and a second position. When the ball valve is in the first position, fluid is allowed to flow from an inlet port to a cylinder port. When the ball valve is in the second position, fluid is allowed to flow from the cylinder port to a drain port. The ball valve sits against one of two valve seats which are constructed from steel and a have radial shape that conforms to the shape of the ball. The hystersis of the steel maintains the ball valve in one of the two positions, so that power does not have to be continuously provided to the solenoids. The ball valve has a hollow inner chamber which significantly reduces the weight of the ball and increases the response rate of the control valve.

5 Claims, 1 Drawing Sheet

DOUBLE SOLENOID LATCHING BALL VALVE WITH A HOLLOW BALL

BACKGROUND OF THE INVENTION

1. Field of the Invention

The present invention relates to a fluid control valve.

2. Description of Related Art

Hydraulic and pneumatic actuators are used in a variety of applications ranging from robotics to a simple mechanical press. Hydraulic actuators are typically controlled by a solenoid activated flow valve which directs fluid into corresponding actuator ports to move the output shaft of the actuator. The solenoids can be connected to a microprocessor based controller or other electrical control means which energize the valves and move the actuators. Conventional solenoid control valves typically have a plunger or a spool that moves when the coil of the solenoid is energized. The plunger or spool may have passages or grooves that allow fluid communication between various ports of the valve.

Conventional spools or plungers typically have a large amount of mass. The large inertia of a plunger/spool requires a large amount of current to move the member. Additionally, a heavy plunger/spool has a slow response time in switching from one position to another position. Consequently, the relatively large mass of conventional plunger/spools creates a valve that is both slow and consumes a large amount of power. It would be desirable to provide a solenoid flow valve that is fast and does not require a large amount of power.

SUMMARY OF THE INVENTION

The present invention is a fluid flow control valve which has a pair of solenoids that move a hollow ball valve between a first position and a second position. When the ball valve is in the first position, fluid is allowed to flow from an inlet port to a cylinder port. When the ball valve is in the second position, fluid is allowed to flow from the cylinder port to a drain port. The ball valve sits against one of two valve seats which are constructed from steel and a have radial shape that conforms to the shape of the ball. The hysteresis of the steel maintains the ball valve in one of the two positions, so that power does not have to be continuously provided to the solenoids. The ball valve has a hollow inner chamber which significantly reduces the weight of the ball and increases the response rate of the control valve.

It is therefore an object of the present invention to provide a control valve which does not consume a large amount of power.

It is also an object of the present invention to provide a control valve that has a relatively quick response time.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
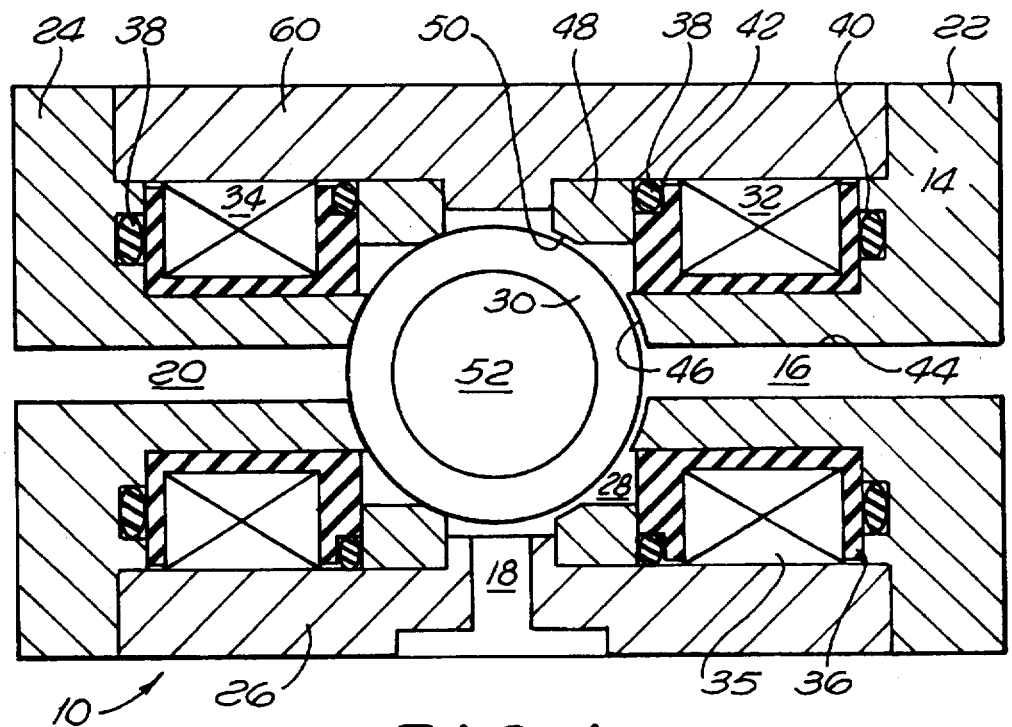
FIG. 1 is a cross-sectional view of a control valve of the present invention showing a ball valve in a first position.

Referring to the drawings more particularly by reference numbers, FIG. 1 shows a control valve 10 of the present invention. The control valve 10 is typically used to control the flow of a fluid into the chamber of an actuator (not shown). Although the control of fluid into an actuator is described, it is to be understood that the control valve 10 of the present invention can be used in any system where the control of fluid flow is required. In the preferred embodiment, the control valve 10 is used to control the flow of a low pressure gas.

The control valve 10 has a housing 14 which contains an inlet port 16, a cylinder port 18 and a drain port 20. In the preferred embodiment, the housing 14 is assembled from a first end piece 22 which contains the inlet port 16, a second end piece 24 which has the drain port 20 and an outer casing 26 which contains the cylinder port 18. Both the end pieces 22 and 24, and the casing 26 are preferably constructed from a 52100 or 440c hardened steel. Although a drain port 20 is shown and described, the control valve 10 of the present invention may be constructed without a drain port 20.

Figure 2:
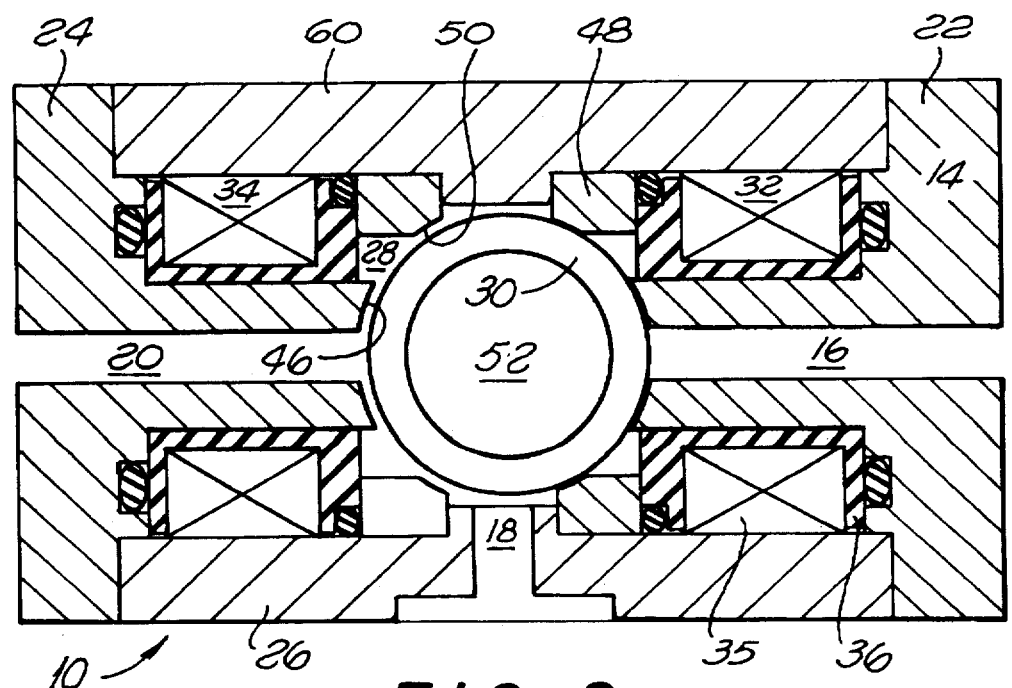
FIG. 2 is a cross-sectional view similar to FIG. 1 showing the ball valve in a second position.

The housing 14 has a valve chamber 28 which contains a ball valve 30 that moves between the first position shown in FIG. 1, to a second position shown in FIG. 2. The ball valve 30 is moved from the second position to the first position by a first solenoid 32 and from the first position to the second position by a second solenoid 34. Each solenoid 30 and 32 includes a coil 35 located within an annular bobbin 36. The solenoids 32 and 34 can be connected to a controller or other electronic control means which control the operation of the valve 10. The valve chamber 28 is sealed by 0-rings 38 located in grooves 40 and 42 in the housing 14 and bobbins 36, respectively.

Each end housing piece 22 and 24 has an inner pole portion 44 which has a seat 46. The seats 46 each have a radial shape which conforms with the shape of the ball valve 30 and allows the ball 30 to sit flush with the inner pole 44. When the ball valve 30 is in the first position, the valve 30 allows fluid to flow from the cylinder port 18 to the drain port 20 and prevents fluid from flowing through the inlet port 16 and into the valve chamber 28. When the ball valve 30 is in the second position, the valve allows fluid to flow form the inlet port 18 to the cylinder port 18 and prevents fluid from flowing through the drain port 20.

Adjacent to the bobbins 36 are a pair of annular outer poles 48. The outer poles 48 have radial shaped seats 50 that conform to the shape of the ball valve 30 and allow the ball 30 to move between the first and second positions. The seats 50 also provide an increased bearing area that reduces the amount of wear on the seats 46 of the inner pole 44. The outer poles 48 are preferably constructed from a 52100 or 440c hardened steel.

The ball valve 30 is preferably constructed from steel and contains a hollow inner chamber 52. The inner 44 and outer steel poles 48 provide a return path for the magnetic flux which emanates from the coils 35 and flows through the ball valve 30. When used in a system that has a relatively low fluid pressure, the hysteresis of the poles 44 and 46 may be great enough to maintain the ball valve 30 in one of the two positions, even when current is not supplied to the coils 34. Thus in a low pressure system, the control valve 10 of the present invention can be switched by providing enough current to move the ball valve 30 and then terminating the supply of current when the ball 30 has reached the new position. Such a usage significantly reduces the power consumption of the control valve 10.

In operation, a current is provided to the first solenoid 32 which pulls the ball valve 30 into the second position shown in FIG. 2. The ball valve 30 blocks the inlet port 16 and allows fluid communication between the cylinder port 18 and the drain port 20. When used in a low pressure system, the current can then be terminated, wherein the hysteresis of the poles 44 and 46 maintain the ball valve 30 in the first position. To switch the control valve 10, a current is then provided to the second solenoid 34 which pulls the ball valve 30 into the first position shown in FIG. 2. When in the first position, the ball valve 30 blocks the drain port 20 and allows fluid to flow from the inlet port 16 to the cylinder port 18. The hollow ball valve 30 has a relatively small mass and can therefore be pulled from one position to another position without a large amount of magnetic force and corresponding current through the coils 35. The lower current reduces the power consumption of the control valve 10. Additionally, the relatively low inertia of the ball allows the valve to switch with a quick response time.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A control valve, comprising:
   a housing that has an inlet port, a drain port, a cylinder port and a valve chamber, said housing further having a pair of radial seats;
   a hollow ball valve that can move within said valve chamber between a first position and a second position, wherein said hollow ball valve allows fluid communication between said cylinder port and said drain port when in said first position and fluid communication between said inlet port and said cylinder port when in said second position;
   solenoid means for generating a magnetic flux that flows through said hollow ball valve and said housing and moving said hollow ball valve between said first and second positions; and,
   a pair of outer poles that are attached to said housing and each have a radial seat, said outer poles provide a return path for said magnetic flux flowing through said hollow ball valve.

2. The valve as recited in claim 1, wherein said solenoid means includes a first solenoid that is magnetically coupled to said hollow ball valve and moves said hollow ball valve to said second position, and a second solenoid that is magnetically coupled to said hollow ball valve and moves said hollow ball valve to said first position.

3. The valve as recited in claim 1, wherein said hollow ball valve is constructed from steel.

4. A control valve, comprising:
   a housing that has an inlet port, a drain port and a cylinder port, said housing further having a valve chamber, a first radial seat within said valve chamber and a second radial seat within said valve chamber;
   a hollow ball valve that can move within said valve chamber between a first position seated adjacent to said first radial seat and a second position adjacent to said second radial seat, wherein said hollow ball valve allows fluid communication between said cylinder port and said drain port when in said first position and fluid communication between said inlet port and said cylinder port when in said second position;
   a first solenoid that generates a magnetic flux that flows through said hollow ball valve and said housing and which moves said hollow ball valve to said first position; and,
   a second solenoid that generates a magnetic flux that flows through said hollow ball valve and said housing and which moves said hollow ball valve to said second position; and,
   a pair of outer poles that are attached to said housing and each have a radial seat, said outer poles provide a return path for said magnetic flux flowing through said hollow ball valve.

5. The valve as recited in claim 4, wherein said hollow ball valve is constructed from steel.

* * * * *